United States Patent [19]

Davis

[11] Patent Number: 4,972,930
[45] Date of Patent: Nov. 27, 1990

[54] DYNAMICALLY ADJUSTABLE ROTARY UNBALANCE SHAKER

[75] Inventor: Evan B. Davis, Renton, Wash.

[73] Assignee: The Boeing Company, Seattle, Wash.

[21] Appl. No.: 456,394

[22] Filed: Dec. 26, 1989

[51] Int. Cl.⁵ .......................... F16F 7/10; F16M 7/00; B64C 17/00
[52] U.S. Cl. .................................. 188/379; 188/380; 244/17.27; 244/75 A; 267/136
[58] Field of Search ............... 267/136; 248/550, 557, 248/559, 638; 188/378, 379, 380; 244/1 R, 17.27, 75 A, 129.1

[56] References Cited

U.S. PATENT DOCUMENTS

| | | | |
|---|---|---|---|
| 1,855,570 | 4/1932 | Edison | 188/378 X |
| 2,038,603 | 4/1936 | Roché | 244/75 A |
| 3,306,399 | 2/1967 | Flannelly | 188/378 |
| 3,387,499 | 6/1968 | Brüderlein | 188/379 X |
| 3,548,972 | 12/1970 | Flannelly | 188/380 |
| 3,611,831 | 10/1971 | O'Neill | 74/574 |
| 3,917,246 | 11/1975 | Gartner et al. | 267/136 |
| 3,989,232 | 11/1976 | Steinbach et al. | 248/550 X |
| 4,042,230 | 8/1977 | Akimoto | 267/136 |
| 4,135,598 | 1/1979 | Stafford | 248/559 X |
| 4,213,518 | 7/1980 | von Hardenberg et al. | 188/380 |
| 4,365,770 | 12/1982 | Mard et al. | 244/17.11 |
| 4,546,960 | 10/1985 | Abrams et al. | 267/136 |
| 4,550,812 | 11/1985 | Mard | 244/17.11 X |
| 4,635,892 | 1/1987 | Baker | 248/550 |
| 4,699,257 | 10/1987 | Lloyd | 188/380 |
| 4,724,923 | 2/1988 | Waterman | 181/208 |
| 4,735,296 | 4/1988 | Pinson | 188/379 |
| 4,926,985 | 5/1990 | Mizuno et al. | 267/136 X |

FOREIGN PATENT DOCUMENTS 2547955 5/1977 Fed. Rep. of Germany ...... 188/379

Primary Examiner—Robert P. Olszewski
Assistant Examiner—A. Muratori
Attorney, Agent, or Firm—Robert H. Sproule; B. A. Donahue

[57] ABSTRACT

A shaker assembly for reducing vibrations in a vibrating structure includes an eccentric mass which is driven at a selected frequency and which drives a shaker assembly. The resonant frequency of the shaker assembly is controlled by a pair of pneumatic springs so as to reduce the vibrations of the vibrating structure. Force damping is provided by a plurality of double acting adjustable air dashpots.

10 Claims, 5 Drawing Sheets

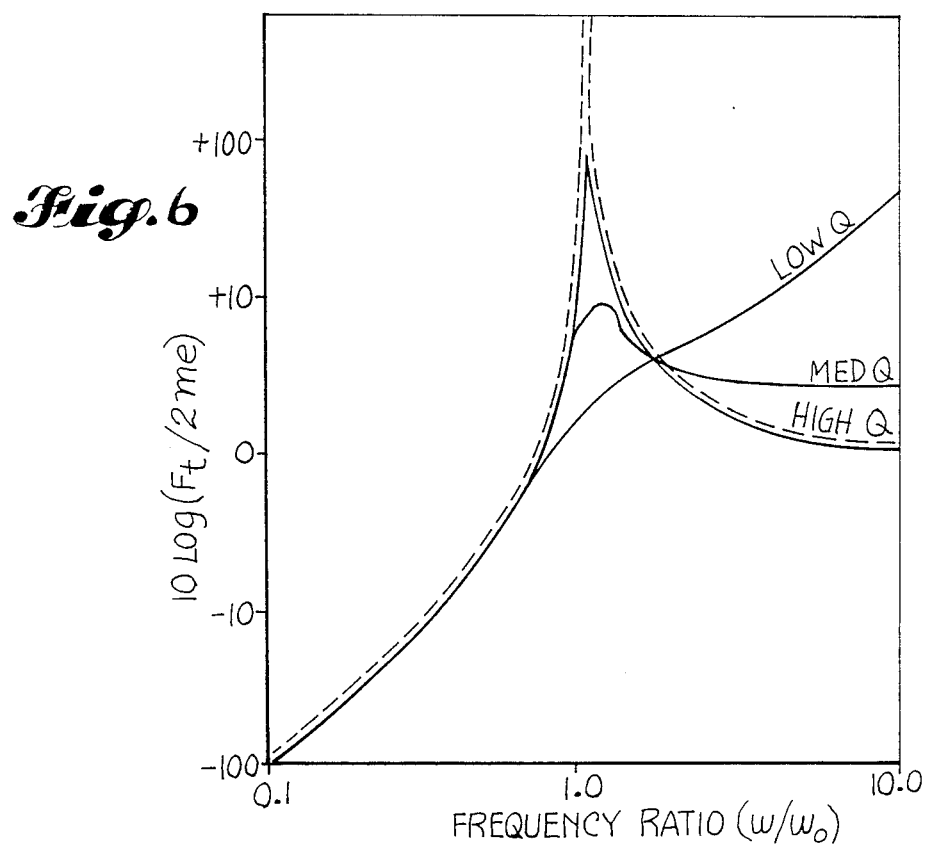

DYNAMICALLY ADJUSTABLE ROTARY UNBALANCE SHAKER

TECHNICAL FIELD

The present invention pertains to a device for reducing cyclical vibrations of a structural workpiece by generating vibrations which oppose the vibrations of the workpiece.

BACKGROUND OF THE INVENTION

Devices for reducing vibrations of a structure are not new. For example, vibrations from aircraft engines are commonly transmitted via the wing and fuselage into the passenger cabin thereby generating unwanted noise inside the cabin. A common method for reducing these vibrations is to fasten a device to the vibrating structure which vibrates at the same frequency but out of phase with the vibrating structure.

One conventional type of vibration reducer is a mass-spring having a resonant frequency that equals the vibration frequency of the vibrating structure. In some applications, however, the vibration frequency of the structure varies making it useful to employ a vibration reducer having a variable resonant frequency.

Other conventional vibration reducers have been disclosed such as in U.S. Pat. No. 4,042,230 by Akimoto which discloses a vibration absorber having pneumatic springs that have adjustable internal pressures to vary the frequency of the absorber; and U.S. Pat. No. 3,387,499 by Bruderlein which discloses a vibrator having a rotating unbalanced mass for generating vibrations which have their amplitude damped by electromagnetic means.

SUMMARY OF THE INVENTION

The present invention pertains to apparatus for reducing the vibrations of a vibrating structure. The apparatus includes a base assembly which is connected to the vibrating structure, and a shaker assembly which is supported for movement relative to the base assembly along a first axis. The apparatus also includes a first pneumatic spring which is connected between the shaker assembly and the base assembly, and a second pneumatic spring which is also connected between the shaker assembly and the base assembly. A shaker motor is provided for moving the shaker assembly (i) in a first direction along the first axis so as to transmit a compression force to the first pneumatic spring which is reacted from the first pneumatic spring to the base assembly, and (ii) in a second direction which is opposite to the first direction along the first axis so as to transmit a compression force to the second pneumatic spring which is reacted from the second pneumatic spring to the base assembly. Furthermore, the invention includes means for adjusting a spring rate constant of the first pneumatic spring and a spring rate constant of the second pneumatic spring so as to adjust a vibration frequency of the shaker assembly in the first direction and in the second direction in a manner to reduce the vibrations of the vibrating structure.

BRIEF DESCRIPTION OF THE DRAWINGS

The present invention will be described in further detail in the following detailed description in conjunction with the attached drawings, in which:

FIG. 6 is an exemplary graph of amplitude as a function of frequency for the exemplary embodiments shown in FIGS. 4 and 5.

DETAILED DESCRIPTION

The present invention pertains to a device for reducing vibrations in a workpiece which is a conductor of vibrations from another vibratory source. In the preferred embodiments disclosed herein, the vibratory source is one or more aircraft engines, and the workpiece is a structural element of the aircraft which conducts vibrations from the engine to the aircraft cabin. It should be appreciated, however, that the present invention is not limited to an aircraft environment.

Figure 1:
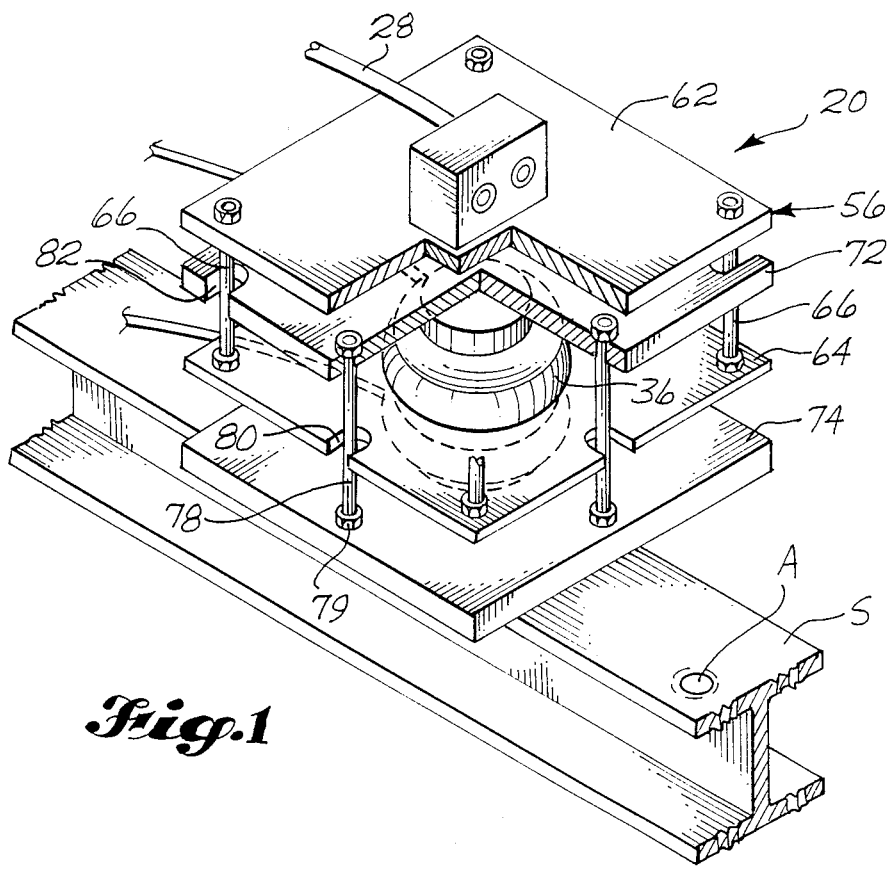
FIG. 1 is an isometric view of an exemplary embodiment of the present invention.

Referring first to FIG. 1 there is shown a vibrating structure S in the form of an I-beam to which there is attached a first embodiment of the vibration reducer of the present invention generally indicated at 20. In the present embodiment, the structure S is assumed to be vibrating in a vertical direction. As shown more clearly in FIG. 2, the vibration reducer 20 includes a conventional electric variable speed motor indicated at 24 which is controlled by a conventional variable speed controller indicated at 26. The motor 24 rotates a flexible drive shaft 28 which in turn drives a shaker motor indicated at 29. Inside the shaker motor 29 the drive shaft 28 rotates a pair of eccentric masses 30 to cause the shaker motor 29 to vibrate up and down at a selected frequency in a manner to be described further.

In order to control the frequency of the vibrator, there is provided a vibrator assembly which includes an upper pneumatic spring 32 (FIG. 2) and a lower pneumatic spring 34. The spring rate of the springs 32 and 34 is a function of the air pressure inside flexible tubes 36 which form a part of each of the pneumatic springs 32, 34. The air pressure is provided from a conventional source 38 of pressurized air, such as a pressurized air cylinder or the like. The pressurized air entering the upper pneumatic spring is controlled via a hose 40 by a valve 42 and is monitored by a pressure gauge 44. Likewise, the pressurized air entering the lower pneumatic spring is controlled via a hose 46 by a valve 48 and is monitored by a pressure gauge 50.

More particularly, the flexible shaft 28 (FIG. 2) drives a left horizontal rigid shaft 52 which is supported by a left vertical strut 54. The left shaft 52 supports the left circular disc 30 which is attached to the shaft 28 at an eccentric location on the disc 30. In order to rotate the right circular disc 30 which is eccentrically supported on a right horizontal rigid shaft 52, a left spur gear 55 is attached to the end of the left shaft 52. The left gear 55 engages a right spur gear 55 attached to the end of right shaft 52 which is supported by a right vertical strut 54. In this manner, rotation of the flexible shaft 28 causes the eccentric disks 30 to rotate in opposite directions transmitting forces in the up and down directions through the supports 54 to the underlying shaker structure.

Figure 2:
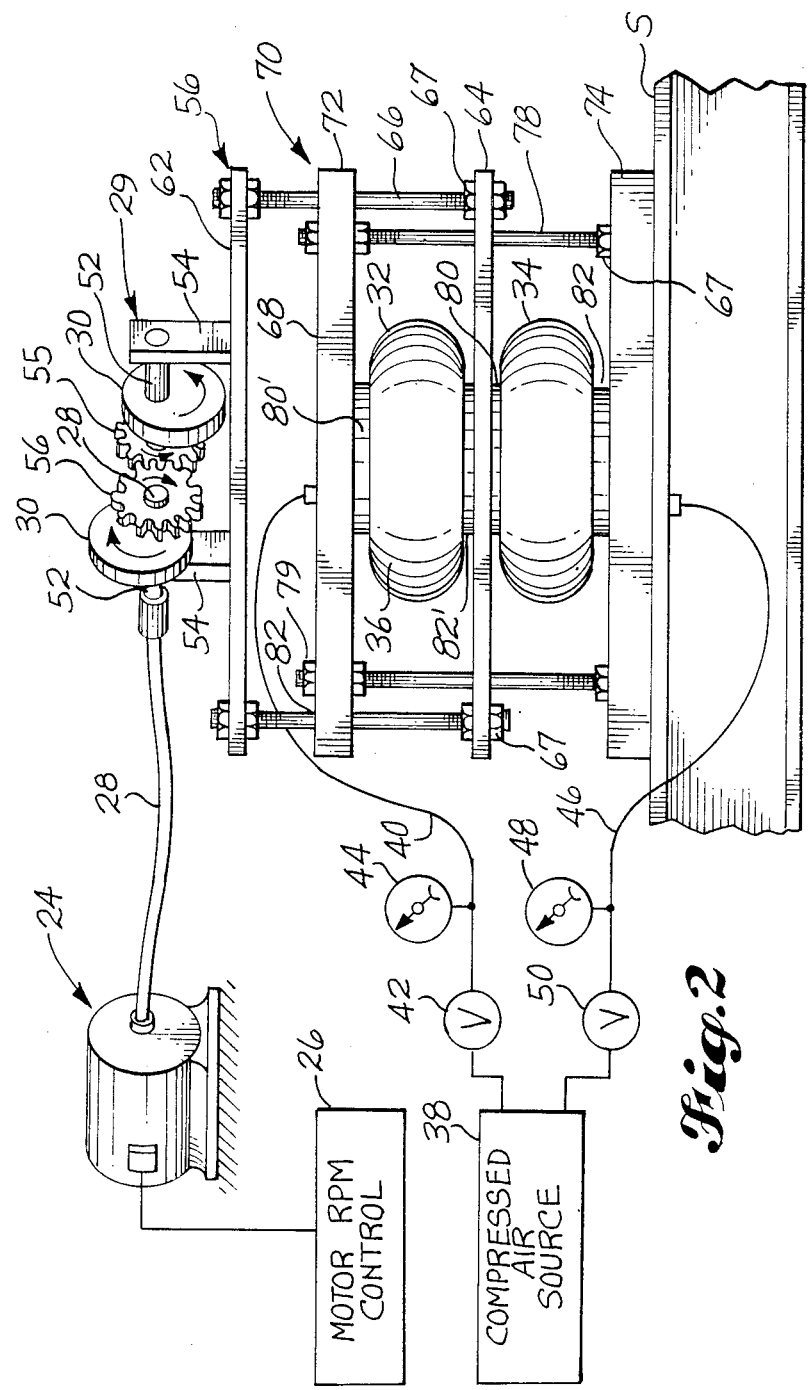
FIG. 2 is a side view of the exemplary embodiment shown in FIG. 1.

As further shown in FIG. 2, the vibrator includes an upper shaker platform assembly indicated at 56 which is formed by an upper rectangular horizontal platform 62 and a lower rectangular horizontal platform 64 which are supported one above the other by four vertical posts 66 which are connected to the upper and lower platforms at each of their corners by nut-and-bolt fasteners 67. In the present embodiment, the vertical supports 54 for the eccentrically mounted disks are fastened to the upper surface of the upper platform 62. On the other hand, the lower platform 64 is located between the upper pneumatic spring 32 and the lower pneumatic spring 34.

Also included in the vibrator is a lower rigid base assembly indicated at 70 formed by an upper horizontal rectangular platform 72 which is located between shaker platforms 62, 64, and a lower horizontal rectangular foundation platform 74 which is rigidly fastened to the upper surface of the vibrating workpiece S by additional fasteners 67. The upper base platform 72 is supported above the lower foundation platform 74 at a location between the upper pneumatic spring 32 and the upper platform 62. This is accomplished by four vertical posts 78 which are connected at the corners of the upper and lower platforms 72, 74 by additional fasteners 67. The posts 78 (FIG. 2) are installed through vertical openings 80 (FIG. 1) in the lower shaker platform 64 to permit up and down movement of the lower shaker platform 64 relative to the posts 78. Likewise, the vertical posts 66 of the upper shaker platform assembly 56 are installed through vertical openings 82 in the upper base platform 72 to permit up and down movement of the posts 66 relative to the upper base platform 72.

Mounted between the center of the lower foundation platform 74 (FIG. 1) and the center of the lower shaker platform 64 is the lower pneumatic spring 34 which in an exemplary embodiment is a Model 1B5—500 or 1B9—200 pneumatic spring mount manufactured by Goodyear Tire and Rubber Company of Akron, Ohio. This lower pneumatic spring includes an upper cylindrical stem 80 which is fastened to the lower surface of the lower shaker platform 64 by conventional fasteners (not shown), and a lower cylindrical stem 82 which is fastened to the upper surface of the lower foundation platform 74 also by conventional fasteners (not shown).

Similarly, the upper pneumatic spring 32, which is identical to the lower pneumatic spring 34, includes an upper cylindrical stem 80 and a lower cylindrical stem 82. As shown in FIG. 2, the upper pneumatic spring 32 is located between the upper base platform 72 and the lower shaker platform 64. The upper stem 80 is fastened to the lower surface of the upper base platform 72 by conventional fasteners (not shown) and the lower stem 82 is fastened to the upper surface of the lower shaker platform 64 by conventional fasteners (also not shown).

When the drive motor 24 is turned on, the eccentric shaker motor 29 transmits forces alternately in the up and down directions to cause the shaker assembly 56 to move up and down at the same frequency. More specifically, during a down stroke of the shaker assembly, the tube 36 of the lower pneumatic spring is squeezed between the lower surface of the lower shaker platform 64 and the upper surface of the lower foundation platform 74. In this manner, the downward force of the shaker motor is reacted through the lower pneumatic spring and lower foundation platform to the vibrating workpiece S. On the other hand, during an up stroke of the shaker assembly 56, the upward force of the lower shaker platform 64 is reacted through the compressed tube 36 of the upper pneumatic spring 32, then through the upper shaker platform 72, the support posts 78 and through the lower foundation platform 74 to the workpiece S.

Figure 3:
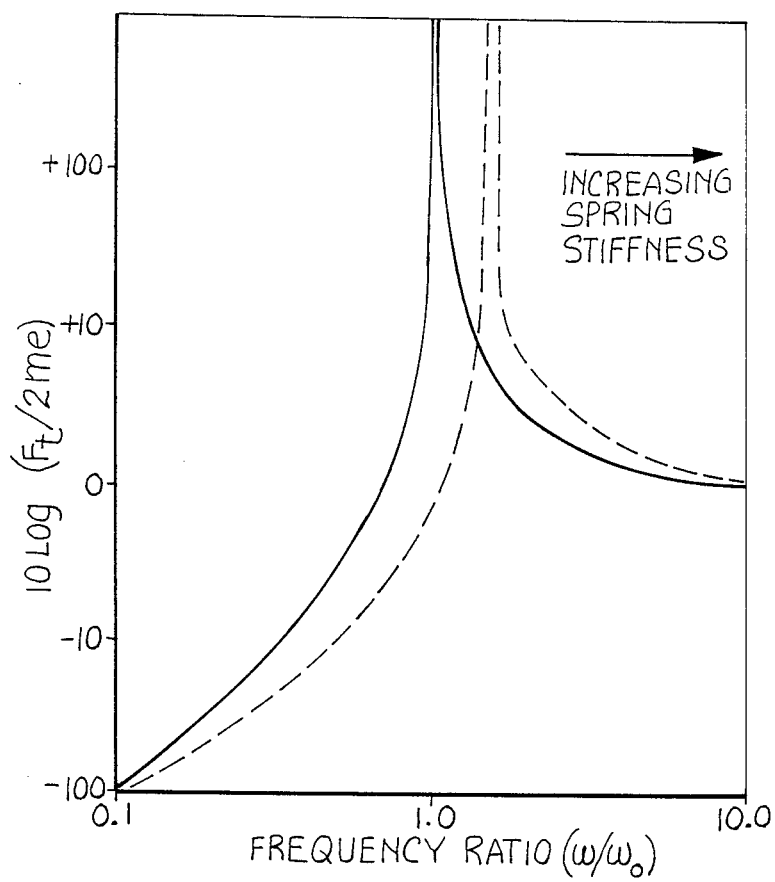
FIG. 3 is an exemplary graph of amplitude as a function of frequency for the exemplary embodiment.

In the present invention, the stiffness of each pneumatic spring is increased by increasing the air pressure inside the tubes 36, and vice versa. At a selected frequency ratio $\omega/\omega_o$ where the variable $\omega$ is the driving frequency in radians per second, and the variable $\omega_o$ is the resonant frequency of the shaker system, the force transmitted from the shaker motor to the workpiece S is a maximum at the resonant frequency of the shaker system. That is, there is shown in FIG. 3 a graph of force as a function of frequency. More specifically, the variable $\omega/\omega_o$ is represented along the x axis, and the variable 10 log $(F_t/2me)$- is represented along the y axis, where $F_t$ is the transmitted force, m is the mass of the offset, and e is the length of the moment arm. As shown therein, the transmitted force from the shaker motor is a maximum at the resonant frequency of the shaker assembly. By increasing the stiffness of the pneumatic springs, the resonant frequency is increased, and vice versa.

As further shown in FIG. 3, when $\omega/\omega_o$ is less than about 0.1, adjustment of the spring stiffness to control transmitted force is of limited use because the transmissibility curves converge in this region. Furthermore, in the range $0.9 < \omega/\omega_o < 1.1 \sqrt{\Delta K/K}$, where K is the spring constant, the shaker system is extremely sensitive to changes in spring stiffness because the transmissibility curves in this region are almost vertical. In order to overcome these problems, in the present invention the amplitude of the transmitted force is also controlled by the addition of one or more damping elements to be discussed below.

Figure 4:
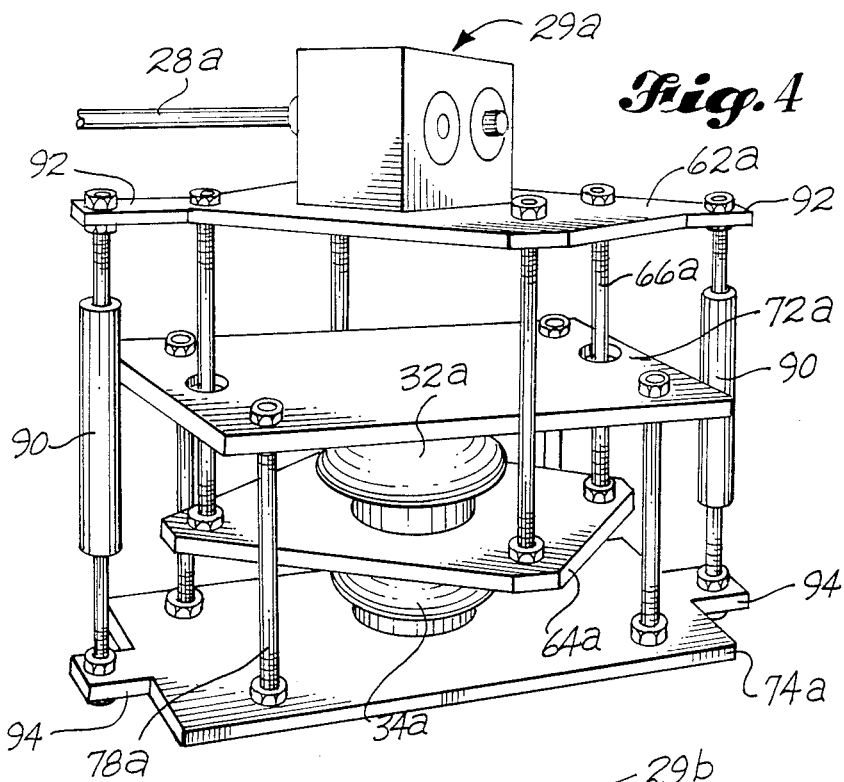
FIG. 4 is an isometric view of another exemplary embodiment of the present invention.

There is shown in FIG. 4 another embodiment of the present invention wherein like elements described with reference to the previous embodiment are identified by like numerals with the suffix "a" attached. The present embodiment includes left, right damping elements 90 which in an exemplary embodiment are adjustable double-acting air dashpots (model Plastishok-Damper) manufactured by Taylor Devices Inc. of North Tonawanda, N.Y. The left, right dampers 90 are vertically connected between the upper shaker assembly platform 62a and the lower foundation platform 74a. More specifically, the upper end of each damper 90 is fastened to respective horizontal flanges 92 which extend outward from the left, right ends of the upper shaker platform 62a. Furthermore, the lower end of each damper 90 is fastened to respective lower horizontal flanges 94 which extend outward from the left, right sides of the lower foundation platform 74a directly below the respective upper flanges 92. Each damper 90 includes an adjustment screw (not shown) for adjusting the damping force as desired. As shown in FIG. 6, adjustment of the dampers 90 provides the desired transfer force amplitude by changing the Q.

Figure 5:
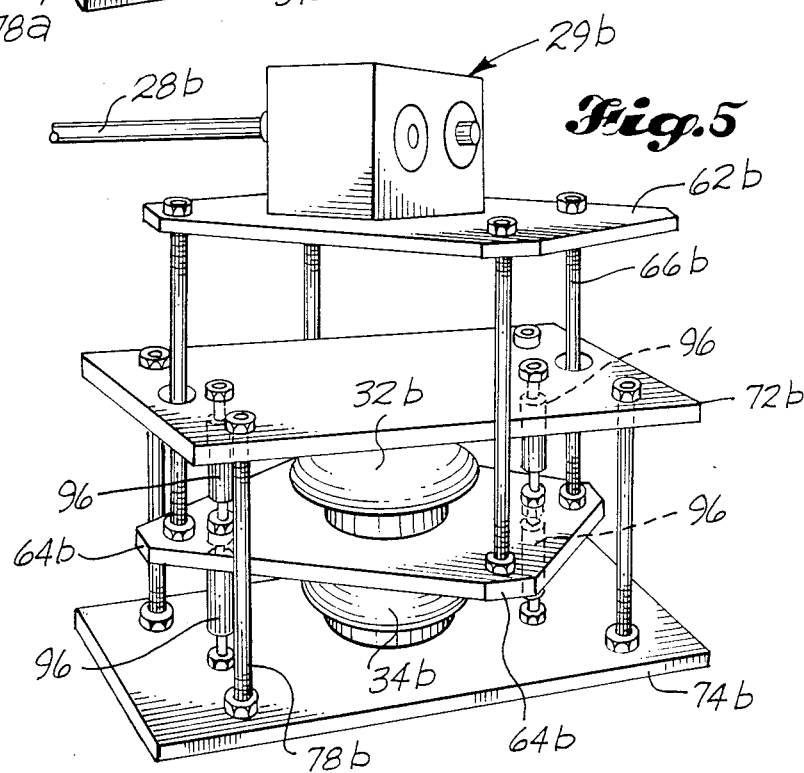
FIG. 5 is an isometric view of a third exemplary embodiment of the present invention.

In a further exemplary embodiment shown in FIG. 5 where like elements described in previous embodiments are designated by like numerals with the suffix "b" attached, four damping elements 96 are provided. Damping elements 96 are identical to damping elements 90 except that they are shorter in length. In this embodiment, a first pair of lower dampers 96 are connected between the lower foundation platform 74b and the lower shaker platform 64b. A second pair of upper dampers 96 are connected between the lower shaker platform 64b and the upper base platform 72b.

In order to operate the system to achieve maximum vibration reduction, there are attached to the vibrating structure S a number of conventional accelerometers designated by the letter A in FIG. 1. By manually adjusting (i) the speed of the motor 24 (FIG. 2), (ii) the internal pressure of pneumatic springs 32, 34 and (iii) the damping force of damping elements 90 (FIG. 4), so that the accelerometer reading is a minimum, vibration reduction is achieved. More specifically, the speed of motor 24 is adjusted slightly to produce the required phase shift between the vibrating structure S and the shaker assembly. Furthermore, the spring pressure is adjusted to achieve the desired shaker frequency and the damping elements are adjusted to achieve the desired shaker force. It is recognized that changing the pneumatic spring pressure also will affect the transmitted force in a manner requiring the spring pressure and damping force to be adjusted together so as to achieve the desired force transmission to the workpiece structure S.

What is claimed is:

1. Apparatus for reducing vibrations of a workpiece, the apparatus comprising:
   a. base means which are connected to the workpiece;
   b. shaker means which are supported for movement relative to the base means along a first axis;
   c. first spring means which are connected between the shaker means and the base means;
   d. second spring means which are connected between the shaker means and the base means;
   e. means for moving the shaker means in a first direction along the first axis so as to transmit a compression force which is reacted from the first spring means to the base means and the workpiece, and for moving the shaker means in a second direction which is opposite to the first direction along the first axis so as to transmit a compression force which is reacted from the second spring means to the base means and the workpiece; and
   f. means for adjusting a spring rate constant of the first spring means and a spring rate constant of the second spring means so as to adjust a resonant frequency of movement of the shaker means in the first and second directions in a manner to reduce the vibrations of the workpiece.

2. The apparatus as set forth in claim 1 wherein:
   a. the shaker means includes (i) a first shaker member which is connected to the moving means and (ii) a second shaker member;
   b. the base means includes a foundation member which is connected to the workpiece and a base member;
   c. the first spring means is connected between the second shaker member and the base member; and
   d. the second spring means is connected between the foundation member and the second shaker member.

3. The apparatus as set forth in claim 2 wherein:
   a. the first and second spring means each include a flexible tube which is filled with a gas; and
   b. the spring rate constant adjusting means includes means for adjusting the pressure of the gas inside the first and second spring means.

4. The apparatus as set forth in claim 2 additionally comprising means for damping movement of the shaker means in the first and second directions so as to adjust a force transmitted from the shaker means to the workpiece.

5. The apparatus as set forth in claim 4 wherein:
   a. the damping means includes an adjustable dashpot having a first end which is connected to the first shaker member and a second end which is connected to the foundation member; and
   b. the dashpot is adjustable so as to adjust the amount of movement of the shaker means in the first and second directions.

6. The apparatus as set forth in claim 1 wherein:
   a. the shaker means includes (i) a first shaker platform which is connected to the moving means and (ii) a second shaker platform;
   b. the base means includes a foundation platform which is connected to the workpiece and a base platform;
   c. the first spring means is connected between the second shaker platform and the base platform; and
   d. the second spring means is connected between the foundation platform and the second shaker platform.

7. The apparatus as set forth in claim 2 wherein the first shaker member is connected to the second shaker member by shaker connection means in a manner that (i) movement of the moving member in the first direction causes a resulting force in the first direction to be reacted by the shaker connection means and the second spring means to the foundation means so as to cause movement of the workpiece in the first direction, and (ii) movement of the moving member in the second direction causes a resulting force in the second direction to be reacted by the shaker connection means and the first spring means to the base means so as to cause movement of the workpiece in the second direction.

8. The apparatus as set forth in claim 7 wherein the base member is connected to the foundation member by base connection means in a manner that movement of the moving member in the second direction causes the resulting force in the second direction to be reacted by the shaker connection means and the first spring means to the base member where the force is further reacted by the base connection means and the foundation member to the workpiece so as to cause the workpiece to move in the second direction.

9. The apparatus as set forth in claim 8 wherein:
   a. the first shaker member and the second shaker member are platforms; and
   b. the shaker connection means are poles which are connected between the first shaker member and the second shaker member.

10. The apparatus as set forth in claim 7 wherein the moving means includes a rotatable unbalanced mass.

* * * * *